ന്ന്3,387,029
OXIDATION OF POLYACROLEINS
Heinz Hartel and Ilse Ursula Nebel, Oberlar, Germany, assignors to Dynamit Nobel Aktiengesellschaft, Troisdorf, Bezirk Cologne, Germany, a corporation of Germany
No Drawing. Filed July 16, 1965, Ser. No. 472,737
Claims priority, application Germany, July 22, 1964, D 45,008
16 Claims. (Cl. 260—530)

ABSTRACT OF THE DISCLOSURE

A method of oxidizing polyacroleins to form polyacrylic acids or their salts is disclosed in which said polyacrolein is reacted in an alkaline aqueous medium with a Cu (II) oxide or hydroxide in the presence of metallic silver, mercury, gold, platinum, osmium, iridium, ruthenium, rhodium or palladium or an oxide of hydroxide thereof. The oxidation product is thereafter recovered either in the form of the acid or its salt.

The present invention relates to processes for the oxidation of polyacroleins to produce polyacrylic acids or their salts.

It is known to polymerise acrolein in an aqueous medium to produce a macromolecular polyaldehyde by radical polymerization:

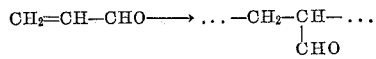

The resulting polyaldehyde exhibits the typical aldehyde reactions, although the aldehyde groups are predominantly not free but, rather, are masked as hemiacetals and hydrated ethers.

For example, polyacrolein may be reduced to polyallylalcohol (Makromol. Chem. 54 (1962) 146), may be subjected to a Cannizzaro reaction (Naturwissenschaften 45 (1958) 440) or oxidized to polyacrylic acid by means of peroxy acids (DAS 1,063,806).

Other possibilities for the oxidation of polyacroleins have been proposed as, for example, the reaction of a polyaldehyde with an alkaline permanganate solution (J. Am. Chem. Soc. 60 (1938) 1911) or hydrogen peroxide or potassium permanganate in pyridine solution (Ang. Chem. 69 (1957) 162).

These procedures have the disadvantage that the transfer of oxygen to the polyaldehyde must be carried out by means of oxidation agents which cannot be regenerated at all or are regenerated only with difficulty and that their available oxygen is additionally much more expensive than oxygen gas or atmospheric oxygen. It has heretofore not been technically feasible to carry out an oxidation of polyacrolein to polyacrylic acid by the known procedures without any loss of oxidizing agent.

It is an object of the present invention to remedy the aforementioned difficulties of the prior art and the numerous additional defects which directly or indirectly result therefrom.

A further object is to oxidize polyacroleins by a process which is efficient and economical.

A still further object is a process for producing such oxidation products continuously.

Additional objects will become apparent from a consideration of the following description and claims:

In accordance with the invention, it has now been found that the oxidation of polyacrolein, polymethacrolein, and their copolymers can be effected by acting on the latter in the presence of alkali with a mixture of copper (II) oxide or copper (II) hydroxide and a noble metal, noble metal oxide or noble metal hydroxide, whereby the polyaldehyde is satisfactorily oxidized to the desired oxidation products.

Preferably the oxidation reaction is effected in the presence of a solvent for the polyaldehyde, for example in the presence of pyridine, dimethylsulfoxyde, diethylsulfoxyde, dimethylformamide or diethylformamide.

The noble metal, metal oxide or hydroxide suitable for use in admixture with the copper oxide or hydroxide include the elements, oxides, and hydroxides of all of the noble metals such as, for example, mercury, silver, gold, and the platinum metals, i.e., platinum, ruthenium, rhodium, palladium, osmium, and iridium. The molar ratio of copper to the noble metal employed ranges from about 1:1 up to about 1,000:1.

The alkaline aqueous medium required for the reaction can be maintained by means of an alkali hydroxide, i.e., sodium hydroxide, potassium hydroxide, or their corresponding carbonates or bicarbonates as, for example, sodium carbonate, sodium bicarbonate, potassium carbonate, potassium bicarbonate, lithium carbonate, etc.

A particular advantage of the process of the invention lies in that the reaction takes place at temperatures between 0 and 100° C., and preferably between 70 and 100° C., and thus can be carried out in such manner that during the reaction the oxidizing agent which is used can be continuously regenerated with oxygen or oxygen-containing gases. It is, therefore, possible even at room temperature or at very slightly elevated temperatures to regenerate the metal compound which has been used in the oxidation of the polyaldehyde and which is then present in a lower valent state and thereby the possibility is achieved of carrying out the process alternately or continuously in such manner that for each of the procedures of oxidation and oxide mixture regeneration the rates of reaction even at temperatures between 20 and about 70° C. will be of approximately the same order of magnitude. It is therefore possible to manage with only small amounts of the oxidizing agent and also to carry out the oxidation continuously with atmospheric oxygen.

The products formed in the oxidation are as acids or salts isolated in the conventional manner, for example, by acidification, concentration of the viscous salt-solutions, and precipitation with inert solvent mixtures as, for instance, methanol and ether or by dialysis and freeze-drying.

The polycarboxylic acids or their salts prepared in accordance with the invention have chemical and physical properties similar to those of products prepared by polymerizing the corresponding monomeric unsaturated acids. The polycarboxylic salts thus produced can be used for the conventional applications in the conventional manner, i.e., as thickeners, protective colloids or finishing agents in the paper or leather industries.

The following examples will further illustrate the nature of this invention, but the invention is not to be considered as limited by these examples:

Example 1

50 g. polyacrolein having a titrated content (oxime) of reactive aldehyde groups amounting to about 67% of theory were suspended in 50 ml. water, 75 ml. 2 N NaOH and thereafter calculated amounts of 2 N NaOH and saturated aqueous solutions of $Cu(NO_3)_2 \cdot 3H_2O$ and $AgNO_3$ were added simultaneously to the resulting suspension, calculated so that the resulting precipitate was a mixture of 41 g. $Cu(OH)_2$ and 13.8 g. AgOH. The mixture thereby produced was allowed to stand overnight at about 50° C. with stirring. The polymeric solid present went completely into solution. It was separated by suction-filtering from the oxide mixture and the oxidation yield was determined titrimetrically to be 97% of theory with respect to the reactive aldehyde groups originally present.

Example 2

10 g. polyacrolein having a titrimetrically calculated content (oxime) of reactive CHO groups amounting to about 67% of theory were introduced into 100 ml. of a water-pyridine mixture (1:2) and, while stirring, first 100 ml. of titrated 2 N $Na_2CO_3$ and then 8.2 g. CuO and 2.6 g. silver were added. Stirring was continued overnight at about 70° C. while oxygen was constantly introduced into the resulting suspension. After filtering off the oxide mixture, the oxidation yield was determined titrimetrically to be 78.1% of theory. The polymeric acid was precipitated from the filtrate and was analyzed after drying to constant weight by IR spectroscopic methods. The characteristic bands of the polyacrylic acid thus produced and a polyacrylic acid prepared from polyacrylonitrile corresponded substantially but not quantitatively.

Example 3

7 g. polymethacrolein, prepared by redox polymerization of methacrolein in an aqueous emulsion, according to Houben-Weyl, Methoden der Organischen Chemie, 4th edition (1961), vol. XIV/1, p. 1089, and having a titrated content (oxime) of reactive aldehyde groups of about 12%, were oxidized as in Example 1, and the oxidation yield was subsequently determined titrimetrically to be about 91.7%, with respect to the reactive aldehyde groups originally present.

Example 4

5 g. of a copolymer of 90 mol percent acrolein and 10 mol percent methacrolein having a titrated amount (oxime) of reactive aldehyde groups of about 56% of theory were oxidized according to the procedure of Example 1. The oxidation yield amounted to 94.6%, with respect to the original aldehyde groups.

Example 5

The procedure of Example 1 was repeated but with a mixture of 45.5 g. CuO and 0.75 g. PdO as the oxidation agent. An oxidation yield of 91% of the original reactive aldehyde groups was obtained after processing.

We claim:

1. A process for oxidizing polyacroleins which comprises reacting in an alkaline aqueous medium the polyaldehyde with Cu (II) oxide or hydroxyd in the presence of a member selected from the group consisting of metallic silver, mercury, gold, platinum, osmium, iridium, ruthenium, rhodium, and palladium, and the oxides and hydroxides thereof, and recovering the corresponding product thereby produced in the form of an acid or salt.

2. Process according to claim 1, which comprises making and maintaining said aqueous medium alkaline by the addition thereto of a member selected from the group consisting of alkali metal hydroxides, carbonates, and bicarbonates.

3. Process according to claim 1, wherein said group member is an oxide and said reaction with CuO is carried out using a molar ratio of CuO to said oxide group member amounting to from 1:1 to 1,000:1.

4. Process according to claim 1, wherein said polyacrolein is utilized in the presence of an inert solvent.

5. Process according to claim 4, wherein said solvent is pyridine.

6. A process for oxidizing a polyacrolein which comprises reacting in an alkaline aqueous medium polyacrolein with CuO in the presence of a member selected from the group consisting of metallic silver, mercury, platinum, osmium, iridium, ruthenium, rhodium, and palladium, and the oxides and hydroxides thereof, and recovering the polyacrylic acid thereby produced in the form of its salt.

7. A process for oxidizing polyacrolein which comprises reacting in an alkaline aqueous medium polyacrolein with CuO in the presence of $Ag_2O$ and recovering the polyacrylic acid thereby produced in the form of its salt.

8. A process for oxidizing polyacrolein which comprises reacting in an alkaline aqueous medium polyacrolein with CuO in the presence of metallic silver and recovering the polyacrylic acid thereby produced in the form of its salt.

9. A process for oxidizing polymethacrolein which comprises reacting in an alkaline aqueous medium polymethacrolein with $Cu(OH)_2$ in the presence of AgOH, and recovering the polymethacrylic acid thereby produced in the form of its salt.

10. A process for oxidizing a copolymer of acrolein and methacrolein which comprises reacting in an alkaline aqueous medium with $Cu(OH)_2$ and AgOH, and recovering the corresponding acid thereby produced in the form of its salt.

11. A process for oxidizing polyacrolein which comprises reacting in an alkaline aqueous medium polyacrolein with CuO in the presence of PdO and recovering the polyacrylic acid thereby produced in the form of its salt.

12. A continuous process for oxidizing polyacroleins which comprises reacting in an alkaline aqueous medium the polyaldehyde with a Cu (II) oxy or hydroxy compound in the presence of a member selected from the group consisting of metallic silver, mercury, gold, platinum, osmium, iridium, ruthenium, rhodium, and palladium, and the oxides and hydroxides thereof, separately recovering the corresponding carboxylic acid thereby produced in the form of its salt from the reaction mixture, subjecting the copper compound following separation of said carboxylic acid salt therefrom to treatment with a gas selected from the group consisting of oxygen and gases containing oxygen at a temperature of about 50 to 100° C. whereby the metal compound used in said oxidation reaction is regenerated.

13. Process according to claim 12 wherein said gas used in said treatment is air.

14. Process according to claim 12 which comprises maintaining the reaction medium during said polyaldehyde oxidation reaction and said regeneration treatment alkaline by addition thereto of a member selected from the group consisting of alkali metal hydroxides, carbonates, and bicarbonates.

15. Process according to claim 1, which comprises introducing a member selected from the group consisting of oxygen and gases containing oxygen into said reaction medium during said oxidizing reaction whereby the metal compounds used up in said reaction are regenerated to a higher oxidation stage.

16. Process according to claim 15, wherein said oxidation and regeneration treatments are effected at a temperature of about 0 to 100° C.

References Cited

UNITED STATES PATENTS

| | | | |
|---|---|---|---|
| 2,212,900 | 8/1940 | Groll et al. | 260—530 |
| 2,288,566 | 6/1942 | Herstein | 260—530 |
| 2,398,867 | 4/1946 | Staudinger et al. | 260—530 |
| 3,127,374 | 3/1964 | Kern et al. | 260—67 |

FOREIGN PATENTS

| | | |
|---|---|---|
| 740,005 | 11/1955 | Britain. |
| 6,500,505 | 7/1965 | Netherlands. |

WILLIAM H. SHORT, *Primary Examiner.*

L. M. PHYNES, *Assistant Examiner.*